(12) United States Patent
Cooper (10) Patent No.: US 10,322,765 B2
(45) Date of Patent: Jun. 18, 2019

(54) SMARTPACK DEVICE FOR A BIKE

(71) Applicant: Peter Cooper, Fishing Point (AU)

(72) Inventor: Peter Cooper, Fishing Point (AU)

(73) Assignee: Peter Cooper, Fishing Point (AU)

( * ) Notice: Subject to any disclaimer, the term of this patent is extended or adjusted under 35 U.S.C. 154(b) by 0 days.

(21) Appl. No.: 16/143,478

(22) Filed: Sep. 27, 2018

(65) Prior Publication Data

US 2019/0031268 A1    Jan. 31, 2019

Related U.S. Application Data

(63) Continuation of application No. 15/583,809, filed on May 1, 2017, now Pat. No. 10,118,660.

(60) Provisional application No. 62/336,583, filed on May 14, 2016.

(51) Int. Cl.
*B62J 99/00* (2009.01)
*G01C 21/26* (2006.01)
*B62J 9/02* (2006.01)
*B62K 19/40* (2006.01)
*H04N 7/18* (2006.01)

(52) U.S. Cl.
CPC ............... *B62J 99/00* (2013.01); *B62J 9/02* (2013.01); *B62K 19/40* (2013.01); *G01C 21/265* (2013.01); *B62J 2099/002* (2013.01); *B62J 2099/0013* (2013.01); *B62J 2099/0033* (2013.01); *H04N 7/183* (2013.01)

(58) Field of Classification Search
CPC ............... B62J 9/02; B62J 2099/0013; B62J 2099/0033; B62K 19/40; G01C 21/265; H04N 7/183
See application file for complete search history.

(56) References Cited

U.S. PATENT DOCUMENTS

| 2007/0164068 A1* | 7/2007 | Godshaw | B62J 9/008 224/430 |
| 2010/0012696 A1* | 1/2010 | Prager | B62J 9/005 224/417 |
| 2015/0102919 A1* | 4/2015 | Hsu | B62J 6/001 340/432 |
| 2017/0245626 A1* | 8/2017 | Nehmad | A45F 4/02 |

FOREIGN PATENT DOCUMENTS

| DE | 202014005839 U1 * | 9/2014 | ............. B62J 9/003 |
| JP | H08142954 A * | 6/1996 | |
| JP | H 08142954 A * | 6/1996 | |
| KR | 20160064999 A * | 6/2016 | ............... B62H 5/00 |

* cited by examiner

*Primary Examiner* — Rodney A Butler (57) ABSTRACT

Disclosed is a smartpack device detachably attached a bike. The smartpack device includes a housing, a locking unit, plurality of indication units, a battery unit, at least one camera, a tracking unit and a wireless communication unit, a computer and a battery unit to power peripheral electrical devices of the bike, and other components of the bike. The tracking unit monitor the movement of the bike and the wireless communication unit communicates the tracked data, processed digital content and sensed data over the communication network. The computer attached to the bike includes a memory unit to store plurality of modules, a touch display unit, and the processing unit. The plurality of modules includes a navigation module, a control module, and a monitoring module.

18 Claims, 6 Drawing Sheets

SMARTPACK DEVICE FOR A BIKE

CROSS-REFERENCE TO RELATED APPLICATION

The present application is a continuation-in part patent application of U.S. patent application Ser. No. 15/583,809, filed on May 1, 2017 which is incorporated herein by reference in its entirety. The U.S. application Ser. No. 15/583,809 further claims the benefit of U.S. Provisional Application Ser. No. 62/336,583, filed on May 14, 2016, which is incorporated herein by reference.

BACKGROUND OF THE INVENTION

1. Field of the Invention

The present invention generally relates to a device detachably attached to the bike, and more particularly relates to a smartpack device having multiple electronic features to increase efficiency of a rider while riding the bike.

2. Description of Related Art

Recently, interest in alternative energy has increased that has led to use of electrical bikes. E-bikes are becoming popular and becoming more used for commuting. The bike may include a frame equipped with rotatable wheels and a tire attached to the wheels. In addition, one or more pedals for driving the wheels and therefore a driving force generated by driving the pedals is transferred to the wheels through a chain.

For this reason, when a person moves a long distance or climbs a hill while riding a bike, he/she consumes much energy. For this, electrical bikes have been developed as alternatives to manual bikes in which a rider has to pedal to spin a wheel using manpower.

However, there are many things the rider needs to sort out before the ride. Such as charging the main battery, charging the front light, charging the rear light, charging any other devices, checking the bike over for any issues, plan the trip, check the weather, make sure they pack the charger(s), wet weather gear, tools, gloves and helmet.

Therefore there is a need of a smartpack device to detachably attach with the chassis of a bike to increase the efficiency of rider while riding. Further, the smartpack device should include plurality of electronic components such as display screen, control buttons to change mode of riding bike, speakers, and a computer to communicate wirelessly over a network.

SUMMARY OF THE INVENTION

In accordance with teachings of present invention, a smartpack device detachably attached to chassis of a bike is provided.

An object of the present invention is to provide a smartpack device including housing, a separating assembly, a locking unit, plurality of indication units, a door, a computer, and a battery unit. The housing is configured to detachably fit in the chassis of the bike. The housing is having an open left portion, a closed right portion, a top portion, a bottom portion, a front portion and a rear portion.

The separating assembly is detachably positioned between the top portion and the bottom portion to divide the left portion in a first portion and a second portion. The locking unit is configured on the rear panel to detachably lock the housing to the bike.

The plurality of indication units is configured on the top portion of the housing to emit light to indicate status of peripheral electric devices of bike. The door is pivotally connected to the bottom portion of the housing to cover the left portion. The door is opened to allow access to the battery unit.

The computer is configured on the top portion. The computer includes a memory unit, a touch display unit, and a processing unit. The memory unit stores plurality of modules. The touch display unit displays the processed plurality of modules and to receive touch commands from a user to access the plurality of modules.

The processing unit is coupled to the memory unit and the touch display unit to process plurality of modules. The plurality of modules includes a GPS module, a navigation module and a control module. The battery unit is configured to rest in the second left portion of the housing and connected to power the computer, the plurality of indication units and the bike electrical peripheral devices.

Another object of the present invention is to provide the smartpack device with a battery holder configured to support the battery unit in the second left portion of the housing. The smartpack device further includes plurality of buttons configured on the top portion to directly access the plurality of modules.

Another object of the present invention is to provide the smartpack device with a warning light configured on the top portion and further connected to the computer to illuminate when the battery is not sufficiently charged. The smartpack device further includes a tool kit to stick on the door such that when the door closes the tool kit moves below the battery unit.

These and other features and advantages will become apparent from the following detailed description of illustrative embodiments thereof, which is to be read in connection with the accompanying drawings.

DETAILED DESCRIPTION OF DRAWINGS

While this technology is illustrated and described in a preferred embodiment, a smartpack device attached to chassis of a bike may be produced in many different configurations, shape, sizes, forms and computer languages. This is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

Figure 1:
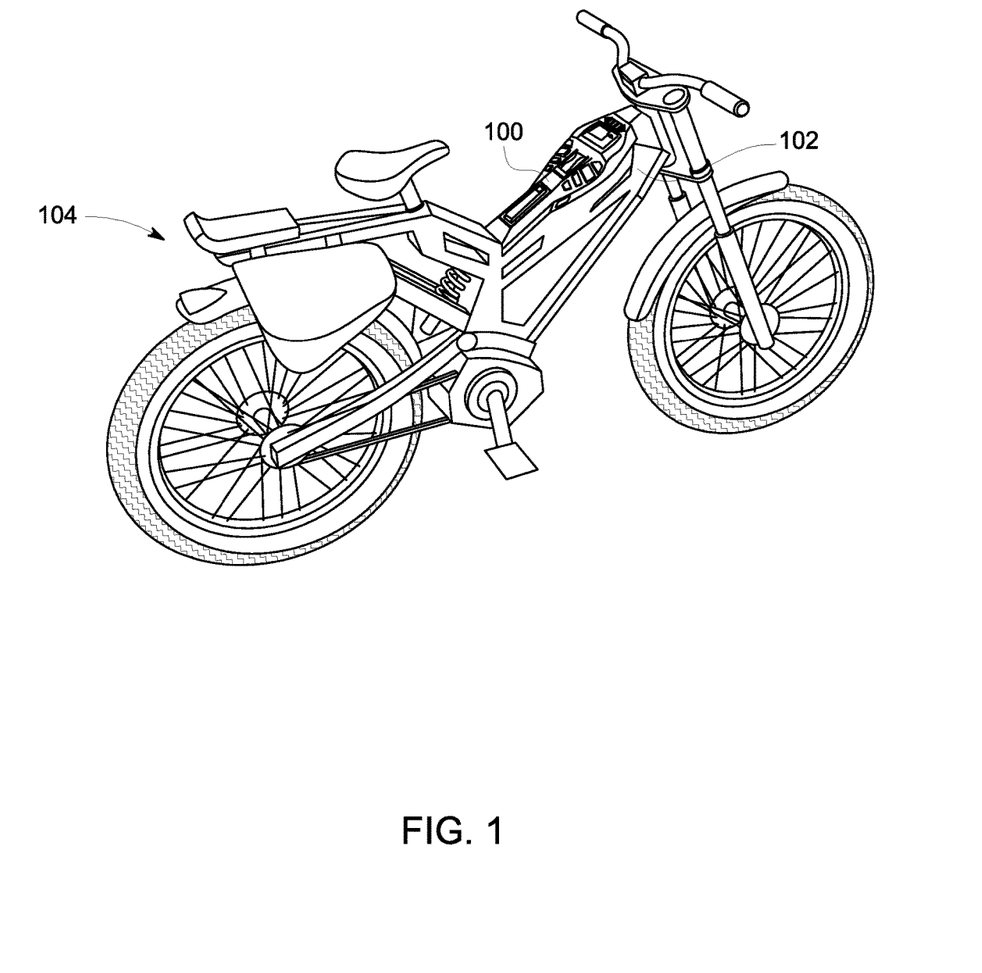
FIG. 1 illustrates a side perspective view of a smartpack device attached to chassis of a bike in accordance with a preferred embodiment of the present invention.

FIG. 1 illustrates a side perspective view of the smartpack device 100 attached to chassis 102 of a bike 104 in accordance with a preferred embodiment of the present invention. The bike 104 includes peripheral electrical devices. Examples of peripheral electrical devices include but not limited to front lights, rear lights, indicator lights, high beam light, rear camera etc. The smartpack device 100 is explained in detail in conjunction with FIG. 2 to FIG. 5 of the present invention.

Figure 2:
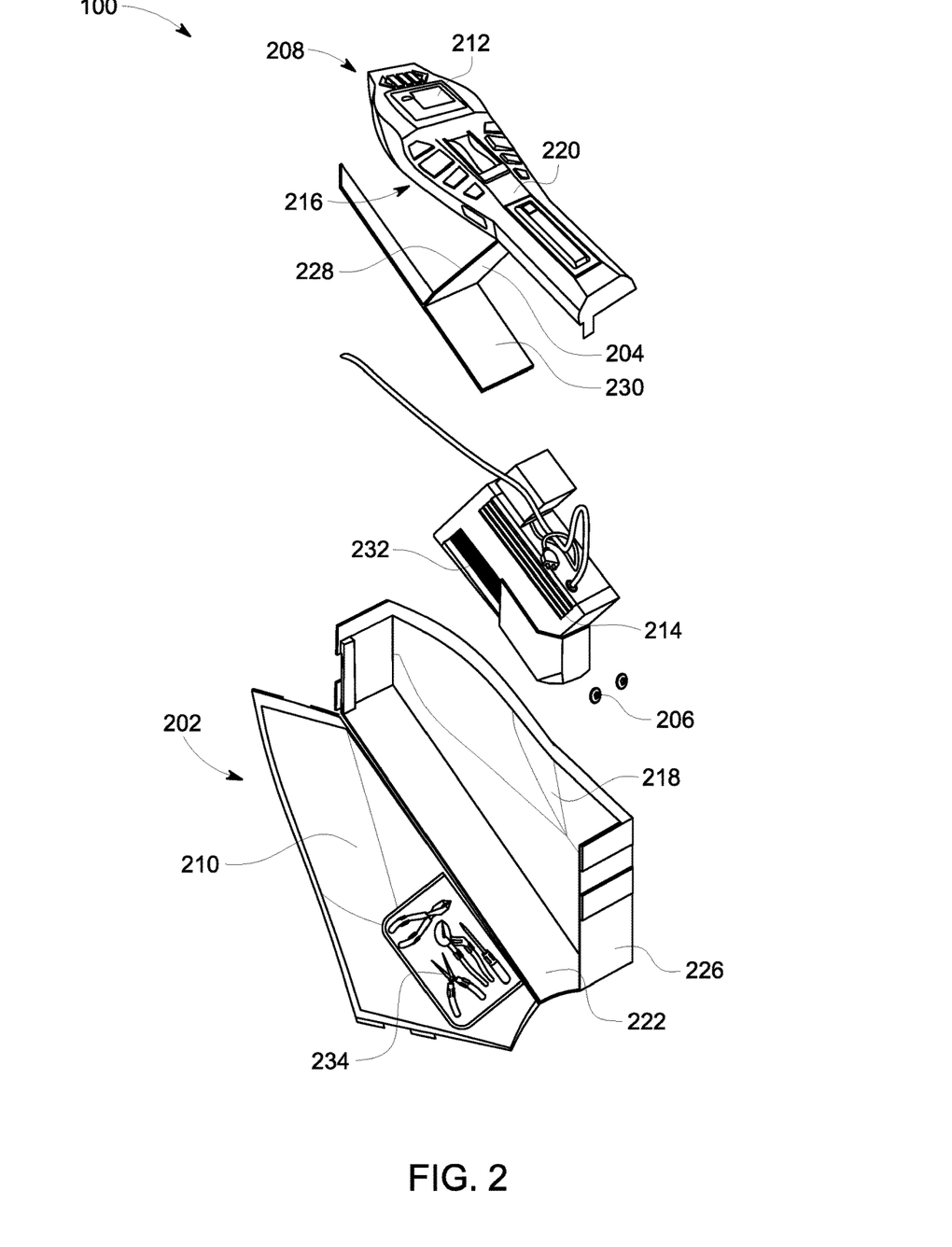
FIG. 2 illustrates an exploded view of the smartpack device in accordance with a preferred embodiment of the present invention.

FIG. 2 illustrates an exploded view of the smartpack device 100 in accordance with a preferred embodiment of the present invention. The smartpack device 100 includes a housing 202, a separating assembly 204, a locking unit 206, plurality of indication units 208, a door 210, a computer 212 and a battery unit 214.

The housing 202 is configured to detachably fit in the chassis (102, shown in FIG. 1) of the bike (104, shown in FIG. 1). The housing 202 includes an open left hollow portion 216, a closed right portion 218, a top portion 220, a bottom portion 222, a front portion (224, shown in FIG. 3) and a rear portion 226.

The separating assembly 204 is detachably positioned between the top portion 220 and the bottom portion 222 to divide the left hollow portion 216 in a first left hollow portion 228 and a second left hollow portion 230. In a preferred embodiment of the present invention, the separating assembly 204 is an inverted T-shaped body to divide the left hollow portion 216 of the housing 202.

The locking unit 206 is configured on the rear portion 226 to detachably lock the housing 202 to the bike (104, shown in FIG. 1). Examples of the locking unit 206 include but not limited to screw, nut, bolt etc. The plurality of indication units 208 is explained in detail in conjunction with FIG. 3 of the present invention.

The battery unit 214 is configured to rest in the second left hollow portion 230 of the housing 202 and connected to power the plurality of indication units 208 and the electrical peripheral devices of the bike. The door 210 is pivotally connected to the bottom portion 222 of the housing 202 to cover the left hollow portion 216. The door 210 opens to allow access to the battery unit 214.

The computer 212 is attached to the bike and receives data from the wireless communication unit. The computer 212 includes a memory unit (618, shown in FIG. 6) to store plurality of modules, a touch display unit (620, shown in FIG. 6) and a processing unit (622, shown in FIG. 6). The computer 212 is explained in detail in conjunction with FIG. 3 of the present invention.

In another preferred embodiment of the present invention, the smartpack device 100 includes a battery holder 232 configured to support the battery unit 214 in the second left hollow portion 230 of the housing 202. Generally, the battery holder 232 is a plastic body shaped to receive the battery unit 214. The battery holder 232 further secures the position of the battery unit 214.

In another preferred embodiment of the present invention, the smartpack device 100 further includes a tool kit 234 configured to stick on the door 210. When the door 210 closes, the tool kit 234 is moved below the battery unit 214 i.e. in the second left hollow portion 230.

Figure 3:
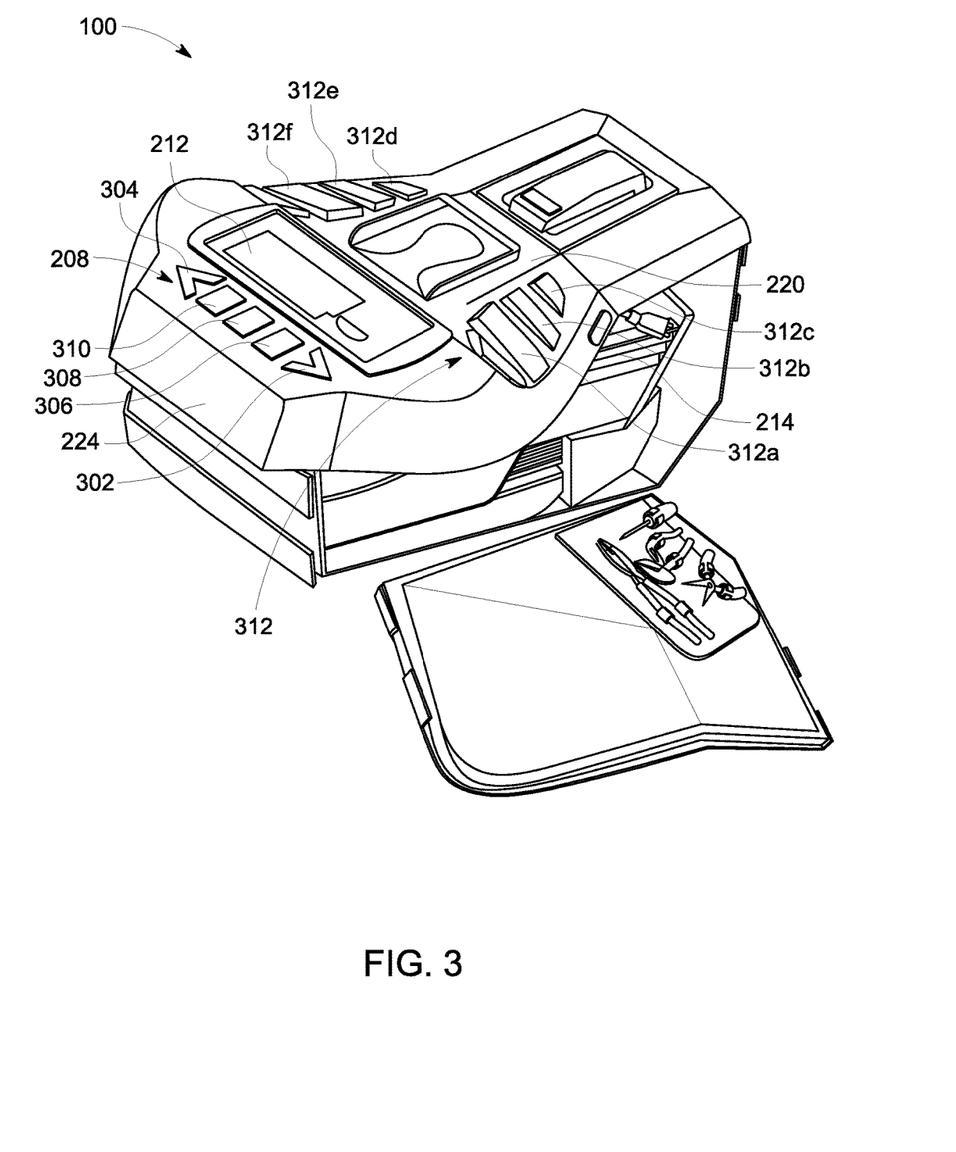
FIG. 3 illustrates a front perspective view of the smartpack device in accordance with a preferred embodiment of the present invention.

FIG. 3 illustrates a front perspective view of the smartpack device 100 in accordance with a preferred embodiment of the present invention. The plurality of indication units 208 include but not limited to a left indicator 302, a right indicator 304, a high beam indicator 306, a headlight indicator 308 and a warning indicator 310.

The computer 212 includes a memory unit to store plurality of modules. The touch display unit (620 shown in FIG. 6) displays the processed plurality of modules. The touch display unit receives touch commands from a user to access the plurality of modules.

The plurality of indication units 208 are positioned on the top portion 220 and near to the front portion 224. In another preferred embodiment of the present invention, the plurality of indication units 208 are touch buttons. The plurality of indication units 208 may also be operated upon pressing.

The computer 212 processes to detect the charging status of the battery unit 214. When the battery unit 214 is not sufficiently charged, the warning indicator 310 is illuminated to indicate a warning sign for the rider. The warning indicator 310 may be pressed by the user to off the warning signal.

The processing unit (622, shown in FIG. 6) is coupled to the memory unit and the touch display unit to process the plurality of modules. The plurality of modules (624, shown in FIG. 6) includes a GPS module, a navigation module (625, shown in FIG. 6) and a control module (627, shown in FIG. 6). The GPS module records the trip data at predetermined intervals and store in the memory unit.

The navigation module displays navigation route information on the touch display unit. The control module controls at least one of plurality of indication units 208 to indicate status of the peripheral electrical devices. The control module is able to receive touch commands through the touch display unit.

In another preferred embodiment of the present invention, the rider is also able to activate the peripheral electrical devices of the bike using the control unit stored in the computer 212. The activation of the peripheral electrical devices is indicated through the indication units 208.

For exemplary purposes, the rider wants to turn left and the rider activates the left indicator peripheral electrical device from the handle of the bike. The indication of turning left is shown on the left indicator 302. Similarly, activation of other electrical peripheral devices from the bike is reflected on the indication units 208 of the smartpack device 100.

In another preferred embodiment of the present invention, the plurality of modules includes a health application module, a no sweat application module, an air quality application module, a dashboard module, and a rear camera module.

The health application module improves health of the rider while riding the bike. The health application module provides various training to the rider for riding the bike. Examples of the training include but not limited to interval training, strength training, endurance training etc.

The no sweat application module provides best modes for riding the bike without breaking sweat. The no sweat application module measures the environmental conditions, the planned route, and rider performance to determine the maximum effort before the rider exerts themselves to the point of generating sweat.

The air quality application module provides information about the weather and air quality of the area. Further, the air quality application modules show the real-time Air Quality Index (AQI). The air quality module activates the warning indicator 310 when the air quality of the air is not favorable for the rider.

The rear camera module coupled to one of the peripheral electrical device such as a rear camera. The rear camera modules allow the rider to view the vehicles approaching from the rear side of the bike on the touch display unit. The dashboard module allows the user to direct access to each of the health application module, no sweat module, the air quality application module and the rear camera module.

The smartpack device 100 further includes plurality of buttons 312 such as 312a, 312b, 312c, 312d, 312e and 312f is configured on the top portion 220 to directly access the plurality of modules stored in the computer 212. The button 312a allows the user to direct access the health application module through the touch display unit of the computer 212.

The button 312b allows the user to direct access the no sweat application module through the touch display unit. The button 312c allows the user the direct access the air quality application module. The button 312d allows the user to directly activate the rear camera and view the rear images on the touch display unit.

The button 312e allows the user to directly open the dashboard module on the touch display unit. The button 312f allows the user to direct access to the navigation module through the touch display unit. In another preferred embodiment of the present invention, the buttons 312 may be reconfigured to access any of the plurality of modules.

Figure 4:
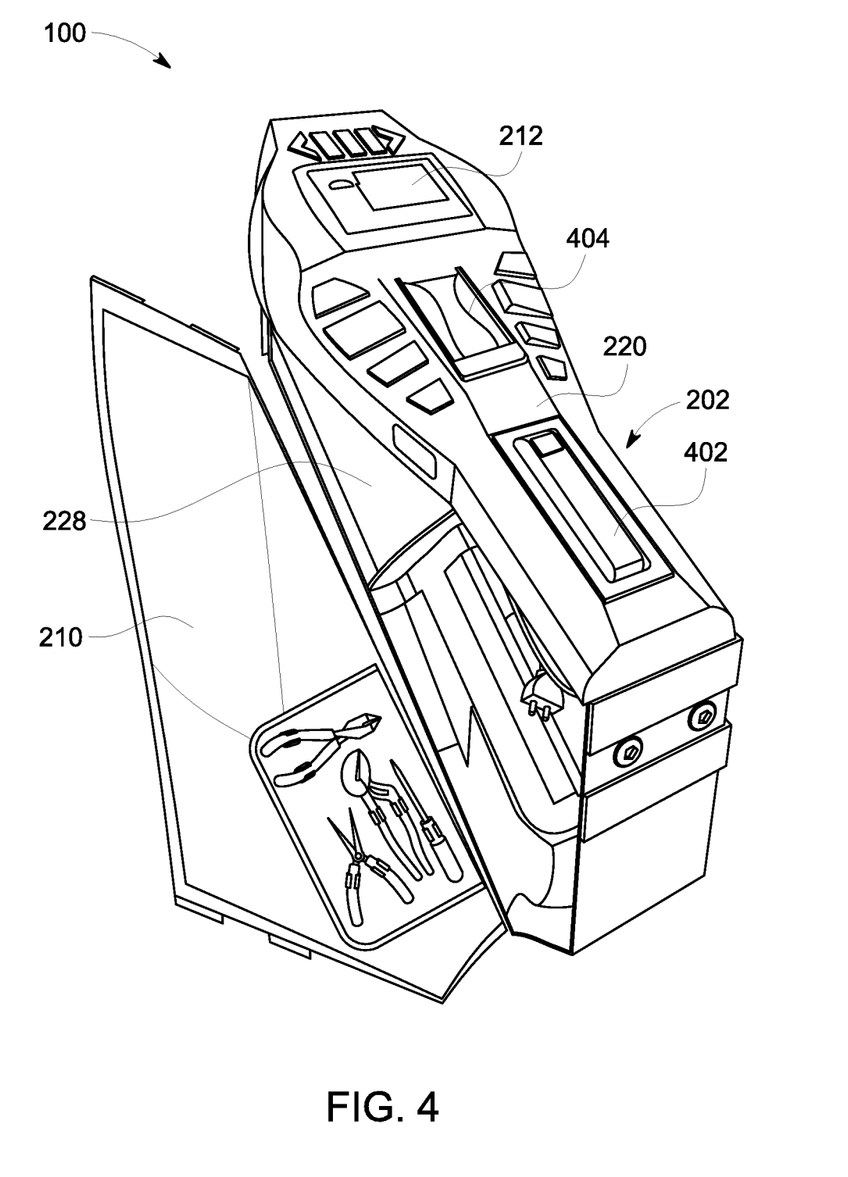
FIG. 4 illustrates a top perspective view of the smartpack device in accordance with a preferred embodiment of the present invention.

FIG. 4 illustrates a top perspective view of the smartpack device 100 in accordance with a preferred embodiment of the present invention. With reference to FIG. 1, the smartpack device 100 further includes a handle 402 embedded on the top portion 220 to carry of the housing 202.

The smartpack device 100 further includes a mobile phone holder 404 configured on the top portion 220 of the housing 202 between the handle 402 and the touch display unit of the computer 212. The mobile phone holder 404 is able to receive and hold any mobile phone.

The mobile phone holder 404 is having a bracket and a flexible body attached within the three sides the bracket. The bracket defines boundary and the flexible body adjust according to size of the mobile phone. The flexible body has an open side to receive the mobile phone.

With reference to FIG. 1, the second left portion 228 may be used to store articles like cleaning materials such as clothes, liquids, duster etc and other materials such as gloves, glasses, document etc. Further, the door 210 may be made up of various materials including but not limited to glass, plastic, fiber etc without deviating from the scope of the present invention.

Figure 5:
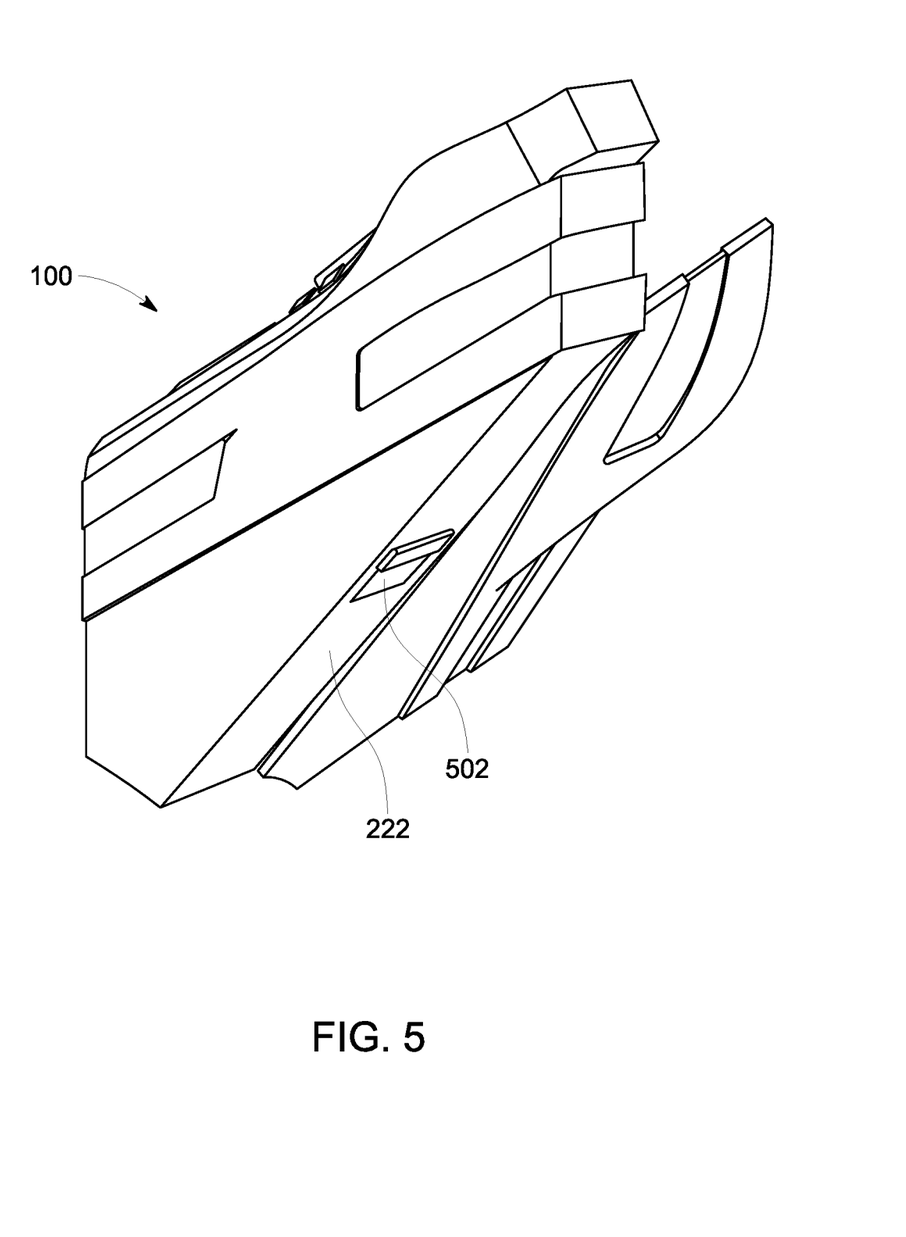
FIG. 5 illustrates a bottom perspective view of the smartpack device in accordance with a preferred embodiment of the present invention.

FIG. 5 illustrates a bottom perspective view of the smartpack device 100 in accordance with a preferred embodiment of the present invention. The smartpack device 100 further includes a passage 502 configured on the bottom portion 222 to allow electric cables of the peripheral electrical devices to reach the battery unit (214, as shown and explained in FIG. 2 and FIG. 3).

Figure 6:
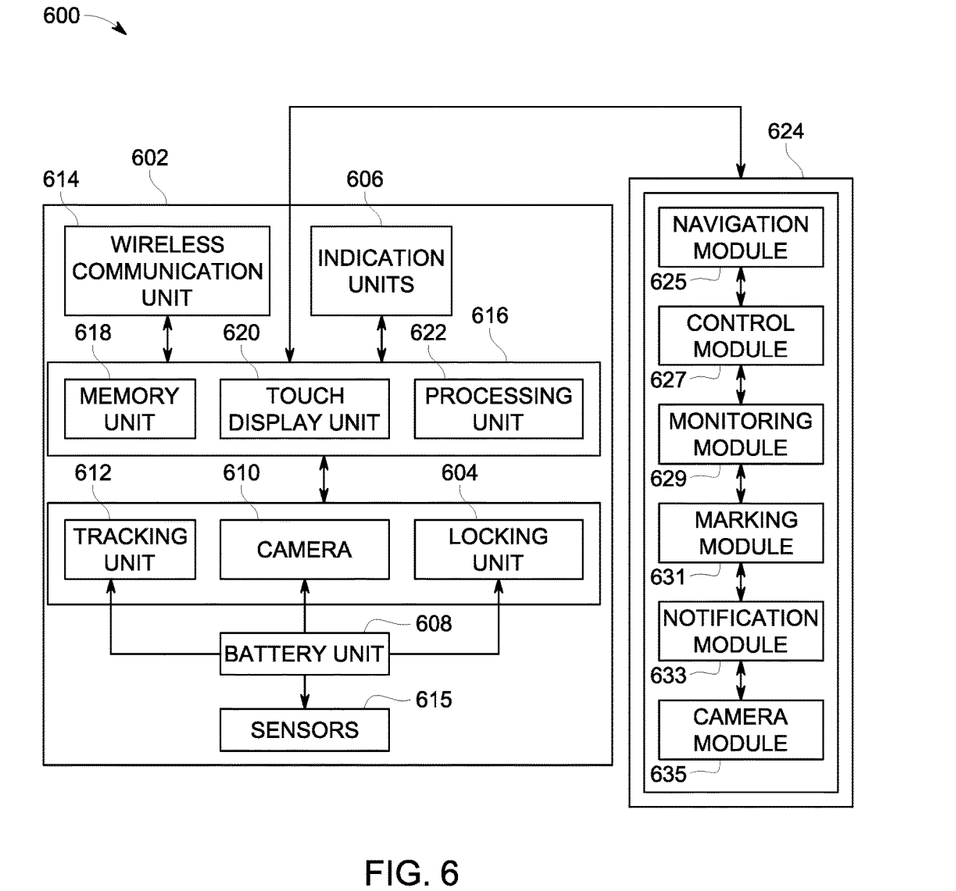
FIG. 6 illustrates a block diagram of a smartpack device in accordance with a preferred embodiment of the present invention.

FIG. 6 illustrates a block diagram of a smartpack device 600 in accordance with a preferred embodiment of the present invention. The smartpack device 600 includes a housing 602, a locking unit 604, plurality of indication units 606, a battery unit 608, at least one camera 610, a tracking unit 612, a wireless communication unit 614 and a computer 616.

The housing 602, a locking unit 604, plurality of indication units 606 and a battery unit 608 are explained in detailed in conjunction with FIG. 1 to FIG. 5 of the present invention. The housing 602 works similar to the housing (202, as explained and shown in FIG. 2 and FIG. 4) explained in above paragraphs of the specification.

The locking unit 604 works similar to the locking unit (204, as explained and shown in FIG. 2) explained in above paragraphs of the specification. The plurality of indication units 606 work similar to the indication units (208, as shown in FIG. 2 and FIG. 3) explained in above paragraphs of the specification.

The battery unit 608 works similar to the battery unit (214, as explained and shown in FIG. 2 and FIG. 3) explained in above paragraphs of the specification. Examples of the battery unit 608 include but not limited to lithium ion, lithium polymer, LED acid etc.

The camera 610 is configured in the bike receives power from the battery unit 608. The camera 610 captures digital content of objects approaching the bike. Examples of the camera 610 include but not limited to hd camera, 360 degrees camera, night camera etc.

The tracking unit 612 is configured in the housing 602 for receiving power from the battery unit 608 to monitor the movement of the bike. Examples of the tracking unit 612 includes but not limited to GPS tracker etc. The tracking unit 612 communicates tracking data to the wireless communication unit 614.

The wireless communication unit 614 is configured in the housing 602 receives power from the battery unit 608 to communicate data over the communication network. Examples of the wireless communication unit 614 includes but not limited to GSM, CDMA, Bluetooth, Internet, wi-fi units, NFC units etc.

In another preferred embodiment of the present invention, the smartpack device 600 further includes sensors 615 configured in the housing 602 and receives power from the battery unit 608. The sensors 615 detect sensing data related to disturbances in speed, location, acceleration, position etc. Examples of the sensors 615 include but not limited to accelerometer, gyrometers, proximity sensors, LIDARs, and other similar devices etc.

The computer 616, the memory unit 618, the touch display unit 620 and a processing unit 622 is explained in detail in conjunction with FIG. 3 of the present invention. The plurality of modules 624 are processed by the processing unit 622.

In another preferred embodiment of the present invention, the wireless communication unit 614 communicates sensing data, tracking data and digital images to a remote computer. The remote computer processes the data and communicates the processed data to the local computer 616. The processed data is then displayed through the touch display unit 620. Example of the remote computer includes but not limited to a remote server, remote smartphones etc.

The plurality of modules 624 further includes a monitoring module 629 to track the position of the bike using the tracking unit 612. The monitoring module 629 communicates the tracking data over the communication network. Further, in another preferred embodiment of the present invention, the monitoring module 629 processes the sensing data and further communicates the processed sensing data over the communication network.

In a preferred embodiment of the present invention, the monitoring module 629 communicates tracking data using an in-built computer's wireless bi-directional communication unit. Alternatively, the monitoring module 629 communicates the tracking data using the wireless communication unit 614. For exemplary purposes, the monitoring module 629 communicates data such as current location, data from the sensors, digital content from the camera, battery status information, route of the bike etc.

In another preferred embodiment of the present invention, the plurality of modules 624 further includes a marking module 631 to mark the travel route of the bike. For exemplary purposes, the marking module 631 allows the user to mark starting location and destination location. Thus, marks the route to travel from the starting location the destination location.

In another preferred embodiment of the present invention, the plurality of modules 624 further includes a notification module 633 coupled to the monitoring module 629 and the marking module 631. The notification module 633 further sends notifications via the communication network when the location of the bike deviates from the marked travel route. The notifications are send through the communication network either as a call, message, digital messages using the wireless communication unit 614.

In another preferred embodiment of the present invention, the plurality of modules 624 further includes a camera module 635 for viewing the digital content received from the camera on the touch display unit 620. Further, the camera module 635 may share the digital content received from the camera over the communication network. Further in another preferred embodiment of the present invention, the digital content may be stored in the memory unit 618.

In another preferred embodiment of the present invention, the smartpack device 600 further includes a microphone to input voice commands, a speaker to release voice signals, an aux unit to allow attachment of smartphone/ipod and other similar devices with the speaker, a siren to raise alarming signals on identifying movement from the marked position.

The present invention offers various advantages such as being able to detachably remove the smartpack device from the bike and may be charged at any location. Further the present invention offers security as the computer and battery are removed from the chassis of the bike. Further the present invention may be used to manage the fleet of bikes, by swapping the smartpack devices among bikes.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A smartpack device detachably attached to a bike, the bike having plurality of peripheral electrical devices, the smartpack device comprising:
    a housing configured to detachably attached to the bike, the housing having an open left hollow portion, a closed right portion, a top portion, a bottom portion, a front portion and a rear portion;
    a locking unit configured on the rear portion to detachably lock the housing to the bike;
    plurality of indication units, wherein each indication unit configured on the top portion of the housing to emit light to indicate status of at least one of peripheral electric devices of the bike;
    a battery unit configured to rest in the left hollow portion of the housing, and further connected to power the plurality of indication units and the peripheral electrical devices of the bike;
    at least one camera configured in the bike receives power from the battery unit for capturing digital content of objects approaching the bike;
    a tracking unit configured in the housing receives power from the battery unit to monitor the movement of the bike;
    a wireless communication unit configured in the housing receives power from the battery unit to communicate data from the camera and the tracking unit over a communication network; and
    a computer attached to the bike and receives data from the wireless communication unit, the computer comprising:
        memory unit to store plurality of modules and pre-determined range of battery power;
        a touch display unit to display the processed plurality of modules and to receive touch commands from a user to access the plurality of modules; and
        a processing unit coupled to the memory unit and the touch display unit to process the plurality of modules, wherein the plurality of modules comprising:
            a navigation module to display navigation route information on the touch display unit;
            a control module controls at least one of plurality of indication units to indicate status of the peripheral electrical devices on receiving commands through the touch display unit; and
            a monitoring module to track the movement of the bike using the tracking unit, wherein the monitoring module communicates the tracking data over the communication network.

2. The smartpack device according to claim 1, wherein the plurality of modules further comprising a camera module for viewing the digital content received from the camera on the touch display unit.

3. The smartpack device according to claim 1 further comprising a battery holder configured to support the battery unit in the left hollow portion of the housing.

4. The smartpack device according to claim 1 further comprising plurality of buttons configured on the top portion to directly access the plurality of modules stored in the computer.

5. The smartpack device according to claim 1 wherein the plurality of indication units comprising a warning indicator configured on the top portion; further the warning indicator connected to the computer to illuminate when the battery power is below the pre-determined range.

6. The smartpack device according to claim 1 further comprising a tool kit configured to stick on the door, such that when the door closes the tool kit moves below the battery unit in the left hollow portion.

7. The smartpack device according to claim 1 further comprising a handle embedded on the top portion to carry the housing.

8. The smartpack device according to claim 6 further comprising a mobile phone holder configured on the top portion of the housing between the handle and the touch display unit to receive the computer.

9. The smartpack device according to claim 1 further comprising a passage configured on the bottom portion to allow electric cables of the peripheral electrical devices to reach the battery unit.

10. The plurality of modules according to claim 1 further comprising a GPS module to record the trip data at predetermined intervals and store in the memory unit.

11. The plurality of modules according to claim 1 further comprising a health application module to improve health of the rider by providing various training to the rider for riding the bike.

12. The plurality of modules according to claim 1 further comprising an air quality module to provide information on weather and air quality of the area to the rider.

13. The plurality of modules according to claim 1 further comprising a no sweat application module to measure environmental conditions, planned route and rider performance to determine maximum effort before the rider exerts themselves to the point of generating sweat.

14. The plurality of modules according to claim 1 further comprising a rear camera module coupled to one of the peripheral electrical device of the bike, the rear camera module to display the rear view from the rear portion of the bike on the touch display unit.

15. The smartpack device according to claim 1 wherein the plurality of indication units are touch buttons to receive touch commands from the rider to activate the peripheral electrical devices of the bike.

16. The smartpack device according to claim 1 wherein the plurality of modules further comprising a marking module to mark the travel route of the bike.

17. The smartpack device according to claim 16 wherein the plurality of modules further comprising a notification module coupled to the monitoring module and the marking module to send automatic notifications via the communication network if the location of the bike deviates from the marked travel route.

18. The smartpack device according to claim 1 further comprising one or more sensors configured in the housing to detect disturbances in movement of the bike, wherein the monitoring module processes the sensed data and further communicates the processed sensed data over the communication network.

* * * * *